(12) United States Patent
Ito et al.

(10) Patent No.: US 10,896,012 B2
(45) Date of Patent: Jan. 19, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Naoki Ito, Tokyo (JP); Takashi Miyauchi, Inagi (JP); Yutaro Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/295,936

(22) Filed: Mar. 7, 2019

(65) Prior Publication Data

US 2019/0286397 A1 Sep. 19, 2019

(30) Foreign Application Priority Data

Mar. 13, 2018 (JP) .................................. 2018-045958
Jan. 9, 2019 (JP) .................................. 2019-001956

(51) Int. Cl.
*G06F 3/12* (2006.01)
*G06K 9/00* (2006.01)
*H04N 1/387* (2006.01)

(52) U.S. Cl.
CPC .......... *G06F 3/1256* (2013.01); *G06F 3/1204* (2013.01); *G06F 3/125* (2013.01); *G06F 3/1286* (2013.01); *G06K 9/00463* (2013.01); *H04N 1/3872* (2013.01); *H04N 1/3878* (2013.01); *H04N 2201/0094* (2013.01)

(58) Field of Classification Search
None
See application file for complete search history.

(56) References Cited

U.S. PATENT DOCUMENTS

| 5,075,785 A | 12/1991 | Sugishima |
| 5,249,069 A | 9/1993 | Petilli |
| 5,794,104 A | 8/1998 | Maruyama |
| 5,901,253 A | 5/1999 | Tretter |
| 6,430,320 B1 | 8/2002 | Jia et al. |
| 6,493,470 B1 | 12/2002 | Ikeda |

(Continued)

FOREIGN PATENT DOCUMENTS

| JP | 05145738 | 6/1993 |
| JP | 07-261599 A | 10/1995 |

(Continued)

*Primary Examiner* — Dov Popovici
(74) *Attorney, Agent, or Firm* — Canon U.S.A., Inc. IP Division

(57) ABSTRACT

A tilt-corrected document image is obtained by performing image analysis processing on a scan image to detect a document area and performing extraction and tilt correction of a document image based on the detected document area. The tilt-corrected document image and a frame indicating a repeat target area are displayed in a repeat target area specification screen. The initially displayed frame indicates an area corresponding to the tilt-corrected document image. A position of the displayed frame can be changed based on a user's instruction on the screen. A repeat layout-processed output image is generated by repeatedly laying out an image of the repeat target area determined based on the frame set on the screen within a specified sheet size, and print processing is made executable.

18 Claims, 16 Drawing Sheets

(56) References Cited

U.S. PATENT DOCUMENTS

| | | |
|---|---|---|
| 6,831,755 B1 | 12/2004 | Narushima et al. |
| 2001/0014183 A1 | 8/2001 | Sansom-Wai |
| 2002/0176120 A1 | 11/2002 | O'Callaghan |
| 2003/0053681 A1 | 3/2003 | Jia |
| 2003/0152291 A1 | 8/2003 | Cheatle |
| 2004/0163049 A1 | 8/2004 | Mori |
| 2005/0099660 A1 | 5/2005 | Yada |
| 2006/0129539 A1 | 6/2006 | Nakatomi |
| 2007/0035771 A1 | 2/2007 | Kitamaru |
| 2007/0036596 A1 | 2/2007 | Takahashi |
| 2007/0146737 A1 | 6/2007 | Morimoto |
| 2007/0146819 A1 | 6/2007 | Kai |
| 2007/0285697 A1 | 12/2007 | Ebina |
| 2008/0231870 A1 | 9/2008 | Sasaki |
| 2010/0245906 A1 | 9/2010 | Nitta |
| 2011/0145085 A1 | 6/2011 | Khachatrian |
| 2011/0255131 A1 | 10/2011 | Inoue |
| 2013/0163846 A1 | 6/2013 | Cooper |
| 2014/0078522 A1 | 3/2014 | Hiraki |
| 2018/0077309 A1 | 3/2018 | Saitoh |
| 2019/0286383 A1* | 9/2019 | Ito ..................... G06F 3/1208 |

FOREIGN PATENT DOCUMENTS

| | | |
|---|---|---|
| JP | 2004-248262 A | 9/2004 |
| JP | 2011-055131 A | 3/2011 |

* cited by examiner

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and image repeat processing for determining a part of a document image included in a scan image as a repeat target image, repeatedly laying out the repeat target image within a recording sheet, and printing the laid-out repeat target images.

Description of the Related Art

Some image forming apparatuses including copying machines and multifunction peripherals have an image repeat printing function. The image repeat printing function is a function of determining a part of an image of a document (document image) read by a scanner as the repeat target image, repeatedly laying out a repeat target image, and printing the resultant on a recording sheet. Japanese Patent Application Laid-Open No. 2004-248262 discusses a technique for allowing a user to select whether to add margins between adjoining ones of repeatedly laid-out repeat target images and to set the number of repetitions in a vertical direction and the number of repetitions in a horizontal direction.

Japanese Patent Application Laid-Open No. 2011-055131 discusses a technique for displaying an image read by a scanner, allowing a user to specify the vertexes of a rectangular frame on the displayed image, clipping out a portion corresponding to the rectangular frame, repeatedly laying out the clipped image as a repeat target image, and printing the resultant.

In a case where a document size detection sensor of the scanner fails detection of a document size when a document placed on a platen of a scanner is scanned, the entire platen is determined as the scan target and a scan image having the same size as that of the platen is obtained. If the technique discussed in Japanese Patent Application Laid-Open No. 2011-055131 is applied to the scan image thus obtained, the scan image having the same size as that of the entire platen is displayed. The user then selects a desired area from the displayed scan image. If the document placed on the platen is of a business card size, the document is considerably small compared to the size of the platen (for example, A3 size). If the entire scan image having the same size as that of the platen (for example, A3 size image) is displayed within a screen, the area of the business card size included in the scan image is displayed so small that the user has difficulty in accurately specifying the area to be repeated. In some configurations, after the entire scan image is displayed on-screen, a portion specified based on user's manual operations may be enlarged for the sake of specifying a repeat target area. In such a case, the user needs to make troublesome operations to enlarge the desired portion.

SUMMARY

According to one or more aspects of the present disclosure, an image processing apparatus includes a memory that stores a program, and a processor that executes the program to perform obtaining a tilt-corrected document image by performing image analysis processing on a scan image to detect a document area and performing extraction and tilt correction of a document image based on the detected document area, displaying a repeat target area specification screen for displaying the obtained tilt-corrected document image and a frame indicating a repeat target area, wherein the frame is initially displayed as a frame indicating an area corresponding to the obtained tilt-corrected document image, and wherein a position of the frame indicating the repeat target area can be changed based on a user's instruction on the repeat target area specification screen, generating a repeat layout-processed output image by repeatedly laying out an image of the repeat target area within a specified sheet size, the repeat target area being determined based on the frame set on the repeat target area specification screen, and executing print processing using the repeat layout-processed output image.

Further features of the present disclosure will become apparent from the following description of exemplary embodiments with reference to the attached drawings.

DESCRIPTION OF THE EMBODIMENTS

Various exemplary embodiments, aspects, and features of the present disclosure will be described in detail below with reference to the drawings. The components described in the exemplary embodiments are merely illustrative and not intended to limit the scope of the present disclosure.

<System Configuration>

Figure 1:
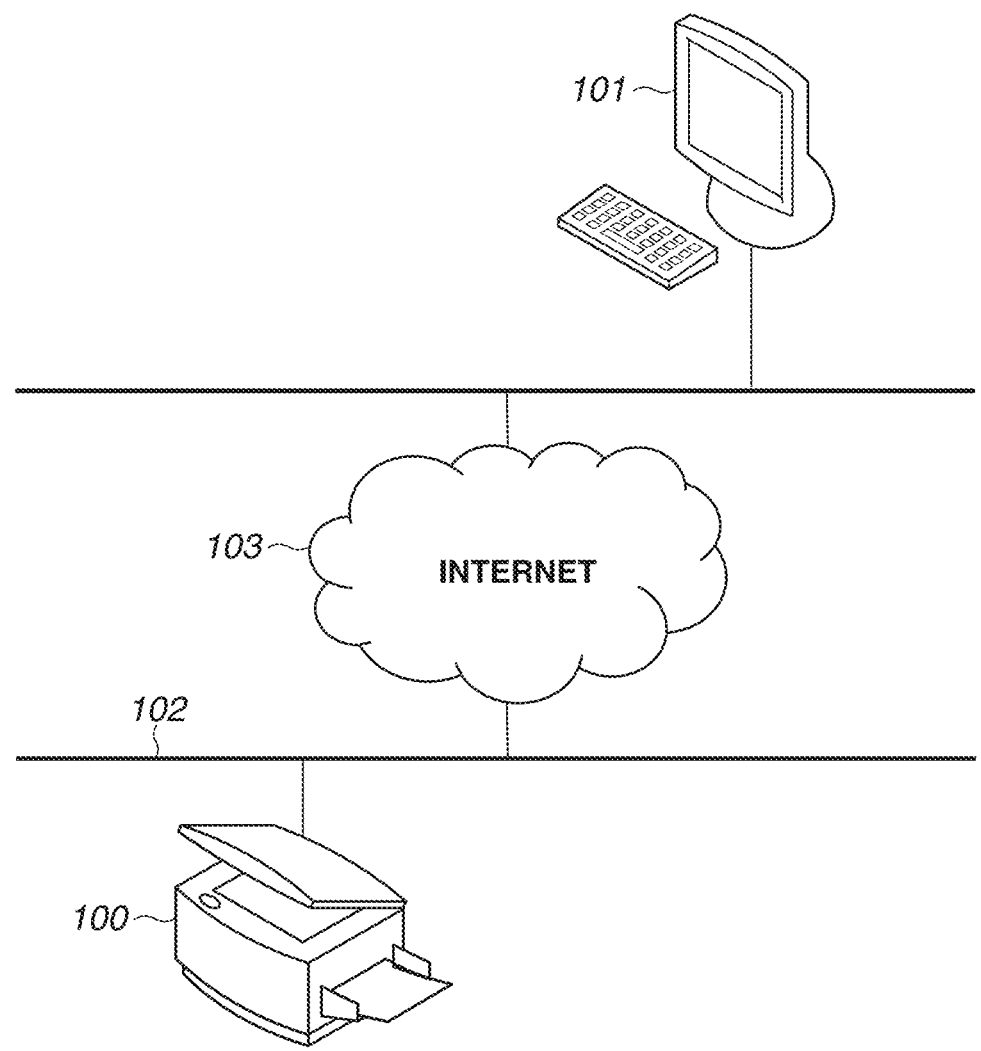
FIG. 1 is a diagram illustrating an overall configuration example of a system.

FIG. 1 is a diagram illustrating an overall configuration of a system to which a first exemplary embodiment can be applied. As illustrated in FIG. 1, an image forming apparatus (image processing apparatus) 100 is connected to a local area network (LAN) 102 and can communicate with a terminal 101, such as a personal computer (PC), via the Internet 103. The terminal 101, such as a PC, is not necessarily indispensable for implementing the present exemplary embodiment. The present exemplary embodiment may include the image forming apparatus 100 alone.

The image forming apparatus (image processing apparatus) 100 is a multifunction peripheral (MFP) including a display and operation unit, a scanner unit, and a printer unit. The image forming apparatus 100 can be used as a scan terminal that scans a document (such as a written document, a business card, an identification photo, a driver's license, and a postcard) using the scanner unit. The display and operation unit includes a touch panel and hardware buttons. The display and operation unit displays a scan image, a preview image of a layout processing result, and a user interface for inputting instructions from the user. According to the present exemplary embodiment, repeat layout processing (also referred to as image repeat processing) for repeatedly laying out a processing target within an output document is performed using an image in an area automatically extracted or manually specified in a scan image as the processing target. A preview image of the layout processing result is displayed on-screen. If the user presses a print start button on the preview screen, the image forming apparatus 100 then performs print processing by using the printer unit.

According to the present exemplary embodiment, the image forming apparatus 100 is described to perform scan processing, the repeat layout processing, and the print processing on a standalone basis. However, the system may be configured in such a manner that part of the processing is performed by the other terminal 101. For example, the scan processing and the repeat layout processing may be performed by the image forming apparatus 100, and the image of the layout processing result may be transmitted to the other terminal 101 via the network and the other terminal 101 may print the image.

<Hardware Configuration of Image Forming Apparatus 100>

Figure 2:
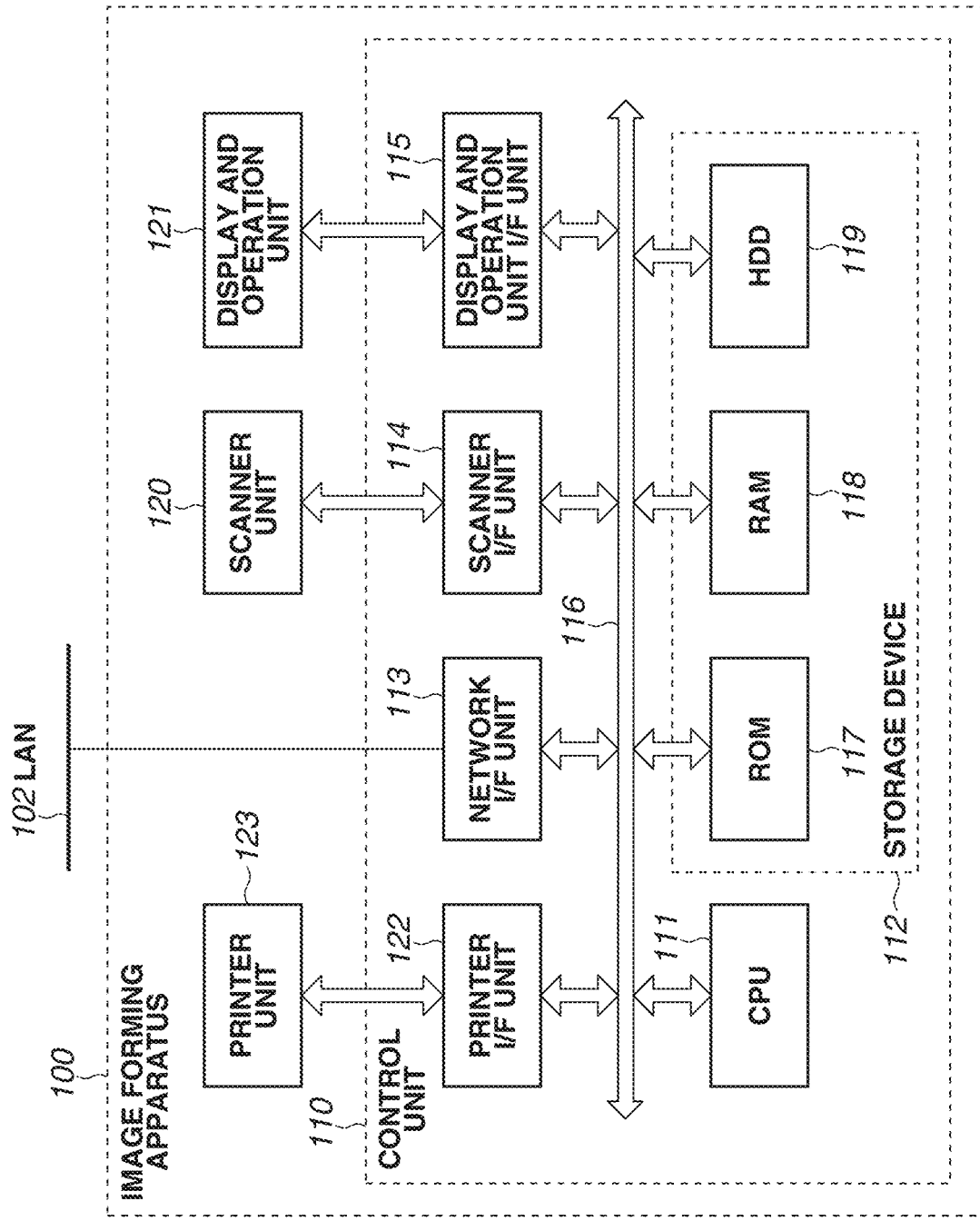
FIG. 2 is a diagram illustrating a hardware configuration example of an image forming apparatus.

FIG. 2 is a block diagram illustrating a configuration of the image forming apparatus 100. A control unit 110 includes a central processing unit (CPU) 111, a storage device 112 (a read-only memory (ROM) 117, a random access memory (RAM) 118, and a hard disk drive (HDD) 119), a network interface (I/F) unit 113, a scanner I/F unit 114, a display and operation unit I/F unit 115, and a printer I/F unit 122, which are connected via a system bus 116 to communicate with each other. The control unit 110 controls operation of the entire image forming apparatus 100.

The CPU 111, which may include one or more processors, one or more memories, circuitry, or a combination thereof, may function as a unit for executing various types of processing (such as a read control, display control, and print control) in a flowchart to be described below by reading a control program stored in the storage device 112 and executing the control program. The storage device 112 stores and retains the foregoing control program, image data, metadata, setting data, and processing result data. The storage device 112 includes the ROM 117 which is a nonvolatile memory, the RAM 118 which is a volatile memory, and the HDD 119 which is a large-capacity storage area. The ROM 117 is a nonvolatile memory storing the control program. The CPU 111 reads the control program and performs control. The RAM 118 is a volatile memory used as temporary storage areas such as a main memory and a work area of the CPU 111.

The network I/F unit 113 connects the control unit 110 (image forming apparatus 100) to the LAN 102 via the system bus 116. The network I/F unit 113 transmits image data to an external apparatus on the LAN 102, and receives various types of information from an external apparatus on the LAN 102.

The scanner I/F unit 114 connects a scanner unit 120 and the control unit 110 via the system bus 116. The scanner unit 120 reads an image on a document to generate scan image data, and inputs the scan image data to the control unit 110 via the scanner I/F unit 114.

The display and operation unit I/F unit 115 connects a display and operation unit 121 and the control unit 110 via the system bus 116. The display and control unit 121 includes a liquid crystal display unit having a touch panel function, and a keyboard.

The printer I/F unit 122 connects a printer unit 123 and the control unit 110 via the system bus 116. The printer unit 123 receives layout-processed image data generated by the CPU 111 via the printer I/F unit 122, and performs print processing on a recording sheet using the received image data.

As described above, the image forming apparatus 100 according to the present exemplary embodiment can provide image processing functions by using the foregoing hardware configuration.

<Image Repeat Processing Function>

The image repeat processing (repeat layout processing) will be described as an image processing function according to the present exemplary embodiment.

The image forming apparatus 100 scans a document placed on a platen of the scanner unit 120 to obtain a scan image. The image forming apparatus 100 obtains a tilt-corrected document image by detection of the document area and extraction and tilt correction of the document area which are performed by executing image analysis processing on the obtained scan image. Details of the processing for detecting the document area will be described below.

The image forming apparatus 100 determines a layout in which the tilt-corrected document image is repeatedly laid out in an output image corresponding to a specified sheet size. The image forming apparatus 100 then generates an image repeat processing result image by laying out the document image based on the determined layout, and displays a preview image on the user interface (UI) of the display and operation unit. The image forming apparatus 100 can accept print instructions for the image repeat processing result image from the user via the display and operation unit 121.

Figure 3:
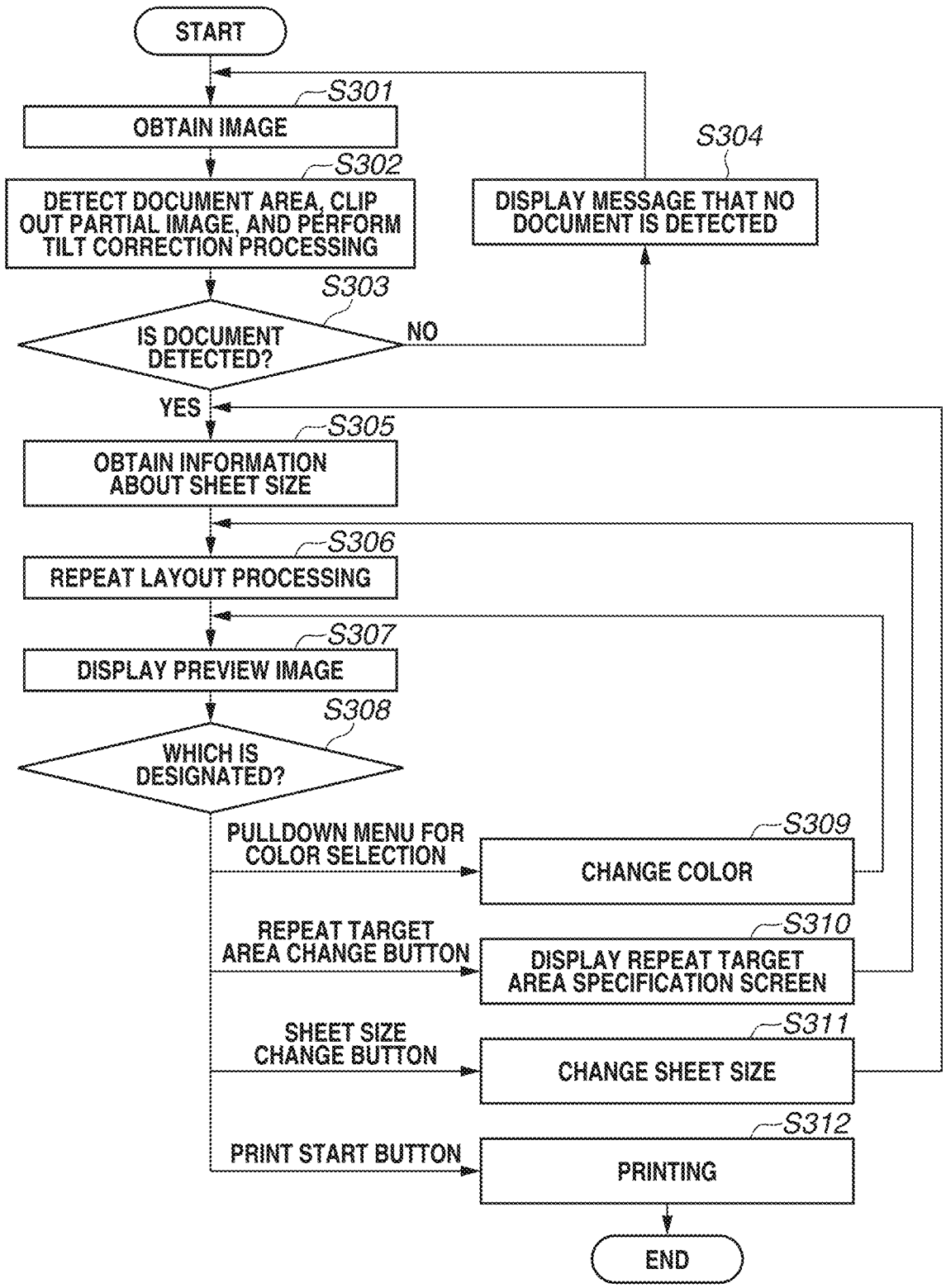
FIG. 3 is a flowchart related to image repeat processing according to a first exemplary embodiment.
Figure 4:
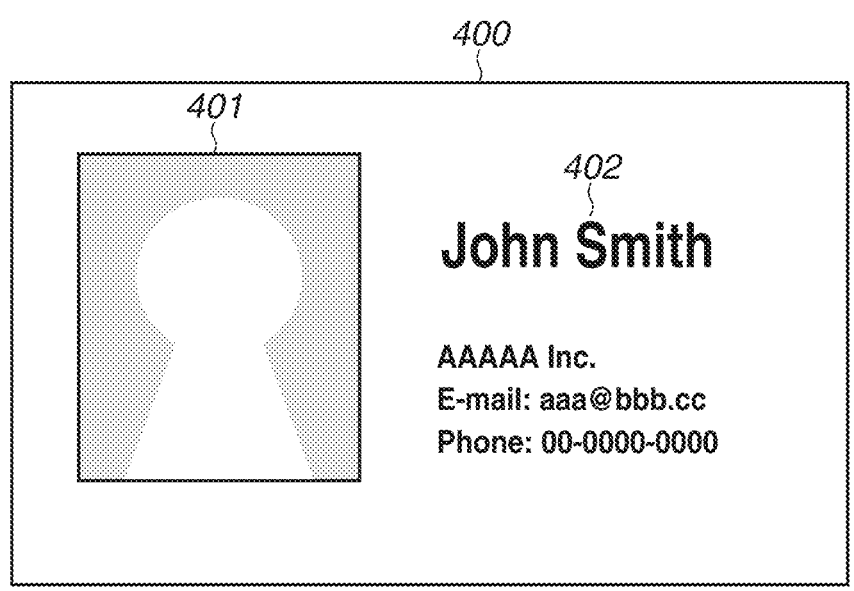
FIG. 4 is a diagram illustrating an example of a document to be scanned.

FIG. 3 is a flowchart illustrating details of the image repeat processing according to the first exemplary embodiment. The CPU 111 of the image forming apparatus 100 loads a processing program stored in the ROM 117 into the RAM 118 and executes the processing program to function as a processing unit that performs the processing of steps in FIG. 3. According to the present exemplary embodiment, a business card illustrated in FIG. 4 is scanned as a scan target document. However, the type of document is not limited to a business card. The document to be scanned may be a regular-sized or irregular-sized document, a driver's license, an identification photo, various types of cards, a postcard, or the like.

Figure 6:
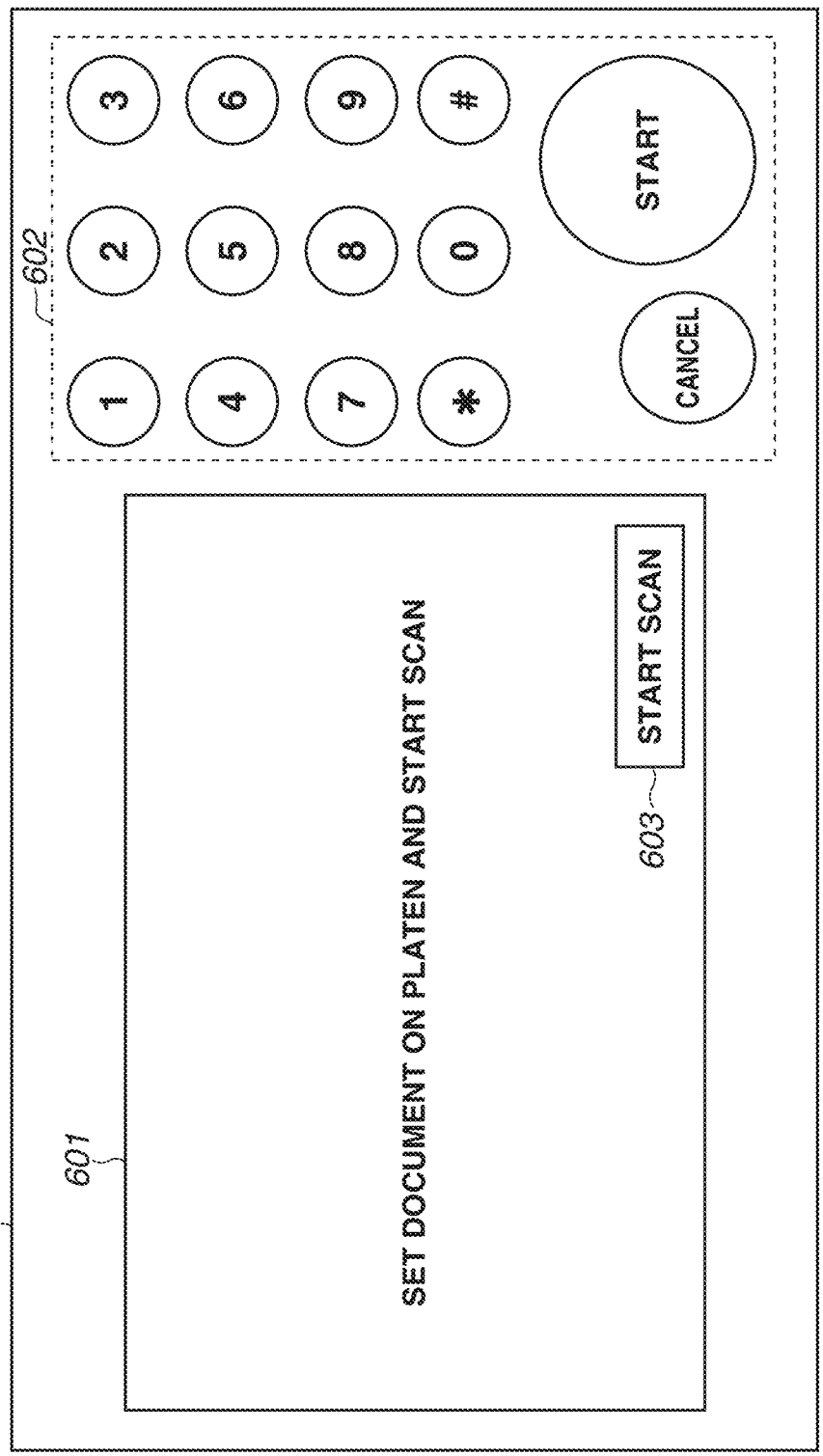
FIG. 6 is a diagram illustrating an example of an operation screen.

When the user specifies an image repeat processing mode on an operation screen of the image forming apparatus 100, an operation screen is displayed on a touch panel display area 601 of FIG. 6. In FIG. 6, the display and control unit 121 includes the touch panel display area 601 and hardware keys 602 (including numeric keys and a start key for various types of processing). The touch panel display area 601 displays a message for prompting the user to set a document on the platen and start a scan, and a scan start button (software key) 603 for issuing an instruction to start a scan.

Figure 5:
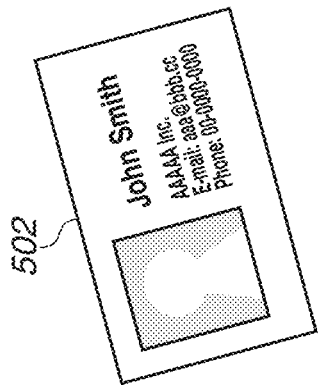
FIG. 5 is a diagram illustrating an example of an image that is obtained as a result of reading a document placed on a platen and has the same size as that of the platen.

When the scan start button 603 is selected by the user, then in step S301, the CPU 111 of the image forming apparatus 100 operates the scanner unit 120 to perform processing for obtaining an image. In a case where a business card or irregular-sized document such as illustrated in FIG. 4 is placed on the platen and scanned, automatic detection of document size by a document size detection sensor sometimes fails. In the image repeat processing according to the present exemplary embodiment, the entire platen is then determined as the read target, and a scan image having the same size as that of the platen is obtained. FIG. 4 is a diagram illustrating an example of a business card (document) 400. The business card 400 includes a facial photo area 401 including a photo and an area 402 including character strings, such as name and address. According to the present exemplary embodiment, the business card 400 is placed on the platen and scanned, and a scan image 501 illustrated in FIG. 5 is obtained. If the business card 400 is carelessly placed on the platen, the business card 400 is scanned with a tilt to the platen. The resulting scan image 501 then includes a tilted business card image 502.

In step S302, the CPU 111 detects a document area by performing image analysis processing (document area detection processing) on the image obtained in step S301, clips out a partial image of the detected document area, and performs tilt correction processing. Thus, the CPU 111 can clip the area of the business card image 502 from the scan image 501 obtained in step S301 and obtain a tilt-corrected image. The processing for detecting the document area and the tilt correction processing can be implemented using conventional methods. For example, to detect a document area from a scan image, the CPU 111 can use a conventional technique for determining an edge-enhanced image by application of a Sobel filter to the scan image and detecting portions where pixels of high edge intensity are linearly arranged as the sides of the document. The CPU 111 then identifies four vertexes based on the detected four sides of the document, and clips out an image of the document area (i.e., extracts a document image from the scan image) based on the identified four vertexes. In a case where the image of the document area clipped from the scan image is tilted, the CPU 111 further performs tilt correction to obtain a tilt-corrected document image. For the tilt correction, for example, the CPU 111 may estimate the tilt angle based on the coordinate values of the identified four vertexes, and rotate the image in a direction to correct the tilt angle. The processing for clipping out the image of the document area (processing for extracting the document image) and the tilt correction processing may be executed in succession. The clipping and the tilt correction may be performed at the same time. For example, the CPU 111 can simultaneously implement the extraction of pixels in a rectangular area surrounded by the four vertexes and the tilt correction by performing predetermined projective transformation processing on the pixels in the rectangular area based on the coordinate values of the four vertexes.

In step S303, the CPU 111 determines whether a document is detected, based on the result of the document area detection processing in step S302. If the CPU 111 determines that there is no document determined (NO in step S303), the processing proceeds to step S304. In step S304, the CPU 111 displays a message that no document is detected and a message for prompting the user to place the document on the platen again and perform a scan again on the display and operation unit 121. In step S303, if the CPU 111 determines that there is a document detected (YES in step S303), the processing proceeds to step S305.

In step S305, the CPU 111 obtains information about the sheet size of a specified output sheet. In case where the sheet size has not been specified by the user, the CPU 111 obtains information about a sheet size set by default (for example, A4 size). In a case where a sheet on a manual feed tray is specified to be used beforehand, the CPU 111 may prompt the user to specify the sheet size here.

In step S306, the CPU 111 executes the repeat layout processing for repeatedly determining a position where a repeat target image is laid out within the output sheet, based on the size of the repeat target image and the information about the sheet size obtained in step S305. The clipped image obtained as a result of the document area detection processing and the tilt correction processing in step S302 (tilt-corrected partial document image) is initially used as the repeat target image. In the repeat layout processing, the CPU 111 calculates how many images can be laid out if the repeat target image is laid out from the top left of the output sheet, based on the vertical and horizontal sizes of the output sheet and the size of the repeat target image. Next, the CPU 111 calculates how many images can be laid out if the repeat target image is rotated by 90° and laid out from the top left of the output image. The CPU 111 then compares the numbers of images laid out with and without the 90° rotation, and generates a repeat-processed image (i.e., output image to be used for print processing) in such a manner that the repeat target image is repeatedly laid out by using the layout in which a greater number of images have been laid out. If the numbers of images laid out with and without the 90° rotation are the same, the CPU 111 generates the output image using the layout without the rotation of the repeat target image.

Figure 7:
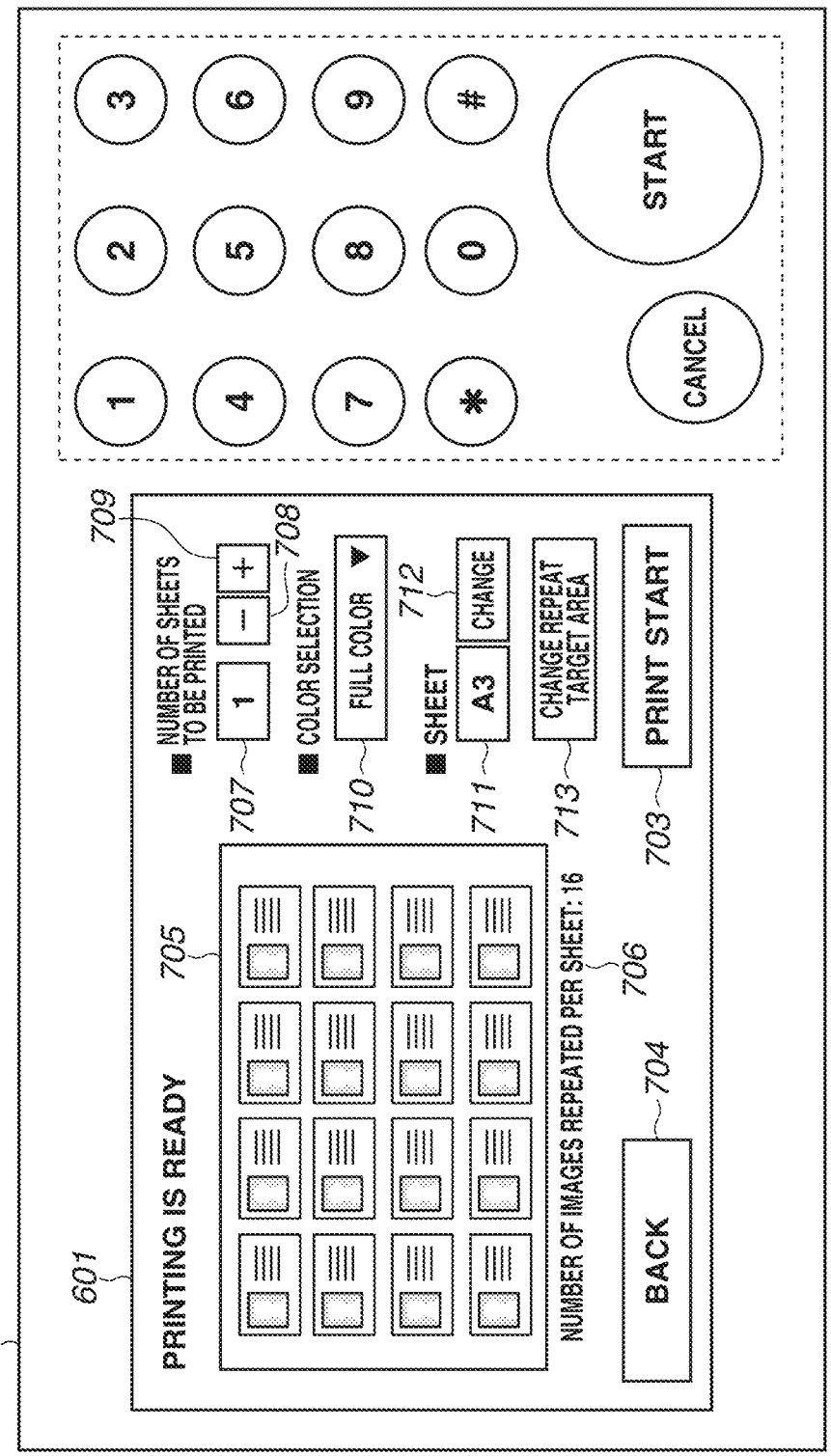
FIG. 7 is a diagram illustrating an example of a preview screen that provides a preview of an image obtained by executing the image repeat processing (repeat layout processing).

In step S307, the CPU 111 generates a preview image of the output image generated in step S306, and displays the preview image on the preview screen of the display and operation unit 121. The preview screen displayed on the display and operation unit 121 will be described with reference to FIG. 7. In FIG. 7, the display contents displayed in the touch panel display area 601 of FIG. 6 have changed to a preview screen for an output image.

In FIG. 7, a preview image 705 of the output image generated in step S306 is displayed. Image number information 706 is further displayed to indicate how many repeat target images are laid out in the output image generated in step S306. In FIG. 7, the example shows that 16 repeat target images are repeated within a single output image.

A number of sheets to be printed 707 displays a numeral indicating the number of sheets for the output image to be printed on. When the user presses a plus button 709, the number of sheets to be printed 707 increases. When the user presses a minus button 708, the number of sheets to be printed 707 decreases. The number of sheets to be printed 707 may be increased or decreased by one each time the plus button 709 or the minus button 708 is clicked on. The number of sheets to be printed 707 may be continuously changed while the plus button 709 or the minus button 708 is long-pressed. The number of sheets to be printed 707 may be input by using the hardware keys.

A pulldown menu 710 is capable of selecting whether to print the output image in color or in monochrome. By default setting, "full color" is automatically selected if the repeat target image is a color image. "Monochrome" is automatically selected if the repeat target image is a monochrome image. The user can change the setting about the full-color printing/monochrome printing by a manual operation using the pulldown menu 710 for color selection. As will be described below in step S309, in a case where the setting about the full-color printing/monochrome printing is changed, the preview image 705 is also changed based on the changed setting. For example, if, in a state where full color is automatically selected, the user changes the setting to monochrome, the preview image 705 is also changed to a monochrome preview image accordingly.

A sheet size 711 displays the currently-set sheet size. If the user presses a sheet size change button 712, as will be described below in step S311, the CPU 111 performs sheet size change processing. If the sheet size is changed, the CPU 111 executes the repeat layout processing of step S306 to generate an output image again based on the changed sheet size and the size of the repeat target image, and updates the preview image 705 of the output image and the image number information 706.

Figure 9:
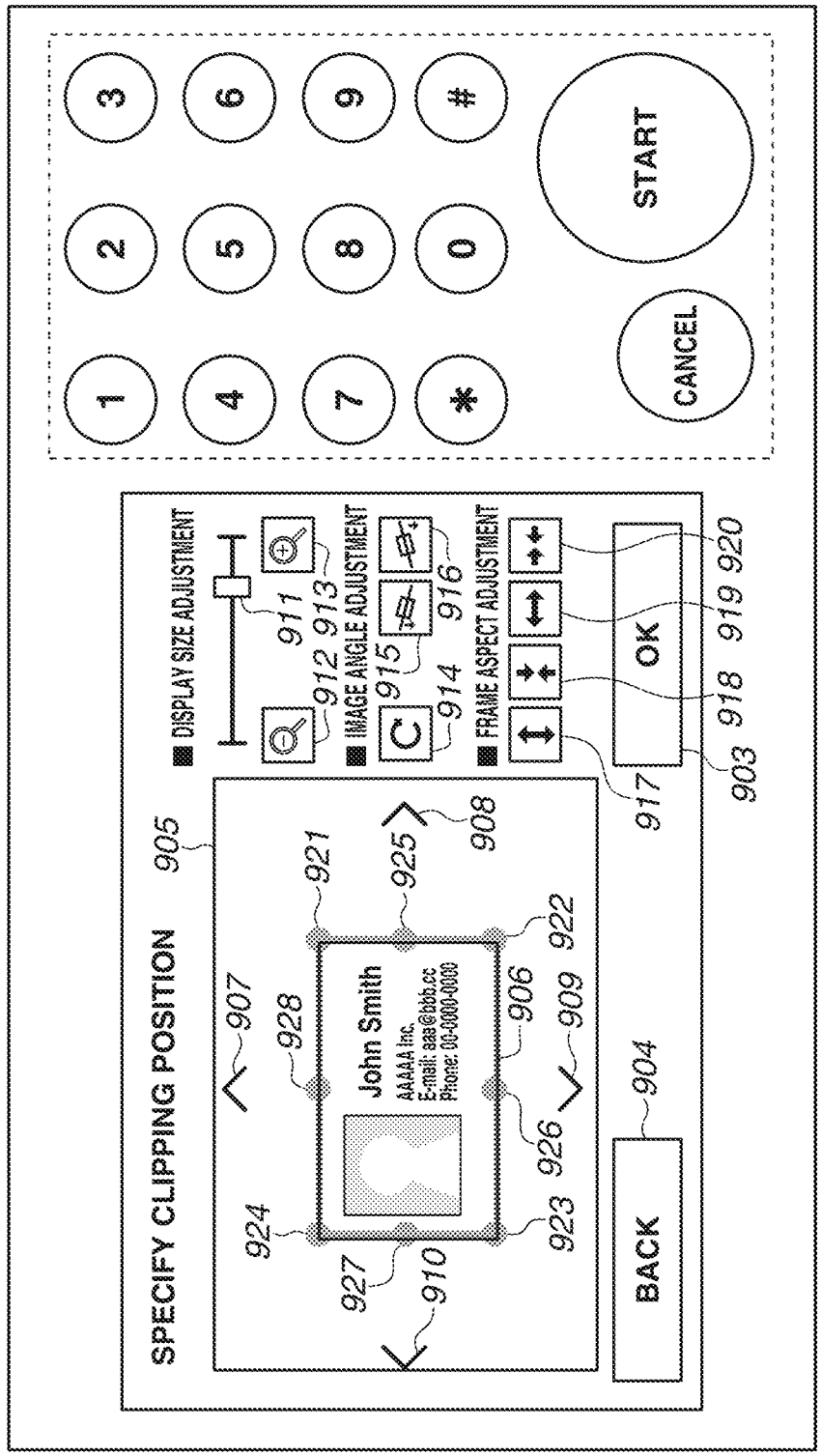
FIG. 9 is a diagram illustrating an example of a default display of a repeat target area specification screen.

When the user presses a repeat target area change button 713, the CPU 111 displays a repeat target area specification screen illustrated in FIG. 9, on which the user can modify the repeat target area into an area having a desired position and size. Details of the repeat target area specification screen of FIG. 9 will be described below in step S310.

When the user presses a print start button 703, as will be described below in step S312, the print processing is started based on the current settings. If the user presses a back button 704, the screen returns to that of FIG. 6.

In step S308, the CPU 111 determines which of the buttons and pulldown menu displayed on the preview screen of FIG. 7 is designated by the user. If the CPU 111 determines that the pulldown menu 710 for color selection is designated (PULLDOWN MENU FOR COLOR SELECTION in step S308), the processing proceeds to step S309. If the CPU 111 determines that the repeat target area change button 713 is designated (REPEAT TARGET AREA CHANGE BUTTON in step S308), the processing proceeds to step S310. If the CPU 111 determines that the sheet size change button 712 is designated (SHEET SIZE CHANGE BUTTON in step S308), the processing proceeds to step S311. If the CPU 111 determines that the print start button 703 is designated (PRINT START BUTTON in step S308), the processing proceeds to step S312.

If, in step S308, the CPU 111 determines that the user's instruction is a change in the setting about the full-color printing/monochrome printing by the pulldown menu 710 for color selection (PULLDOWN MENU FOR COLOR SELECTION in step S308), the processing proceeds to step S309. In step S309, the CPU 111 updates the display of the pulldown menu 710 based on the changed setting. The processing then returns to step S307. In step S307, the CPU 111 also updates the preview image 705 based on the changed setting. For example, if the full color printing is being set and the setting is changed to the monochrome printing by the pulldown menu 710, then in step S307, the CPU 111 generates a monochrome preview image and updates the display of the preview image. The generation timing of a monochrome preview image and a monochrome output image is not limited to the timing of when the setting is changed to the monochrome printing by the pulldown menu 710. For example, both a color preview image and a monochrome preview image may be generated in advance when a preview image is generated for the first time based on the output image that is generated by the repeat layout processing of step S306 based on the image clipped out in step S302.

If, in step S308, the CPU 111 determines that the user's instruction is issued by pressing of the repeat target area change button 713 (REPEAT TARGET AREA CHANGE BUTTON in step S308), the processing proceeds to step S310. In step S310, the CPU 111 displays the repeat target area specification screen (FIG. 9) for changing the repeat target area on the touch panel display area 601.

Details of the repeat target area specification screen of FIG. 9 will be described. In FIG. 9, a display area 905 displays a preview image of a clipped image (tilt-corrected partial document image) obtained as a result of the document area detection processing and the tilt correction processing in step S302. A frame 906 indicating the position of the repeat target area at that point in time is displayed on the clipped image in a superimposed manner. The frame 906 indicating the position of the repeat target area can be displayed in lines of distinguishable color (for example, red). Before the repeat target area is changed based on the user's instructions, as illustrated in FIG. 9, the frame 906 is displayed with the partial document image detected and clipped out in step S302 as the repeat target area. Handlers (vertex handlers) 921, 922, 923, and 924 are displayed at the vertexes of the frame 906. The user can reduce and enlarge the repeat target area by changing the positions of the vertexes of the frame 906 by using the handlers 921, 922, 923, and 924. Handlers 925, 926, 927, and 928 are used by the user to change the positions of the sides of the frame 906. The user can also reduce and enlarge the repeat target area by operating the handlers 925, 926, 927, and 928. If any one of arrows 907, 908, 909, and 910 is pressed by the user, the displayed partial document image moves in the direction of the pressed arrow. In other words, the clipping position can also be adjusted to a user-desired clipping position by relatively moving the partial document image by using the arrows 907, 908, 909, and 910 without moving the position of the frame 906. The operations to move the partial document image are not limited to those on the arrows 907, 908, 909, and 910. The user can also be allowed to move the partial document image by performing a touch & drag operation on a position outside the frame 906 and inside the display area 905 of the preview image.

A bar 911 indicates the state of display magnification of the image displayed in the display area 905. The bar 911, when located to the right, indicates enlarged display. The bar 911, when located to the left, indicates reduced display. If the user presses a button 912, the image is displayed at a lower display magnification. If the user presses a button 913, the image is displayed at a higher display magnification. The display magnification can also be changed by directly dragging the bar 911 to the right or left. If the user presses a button 914, the display orientation of the image displayed in the display area 905 is rotated by 90°. If the user presses a button 915, the image displayed in the display area 905 is rotated counterclockwise in steps of 0.5°. If the user presses a button 916, the image displayed in the display area 905 is rotated clockwise in steps of 0.5°. According to the present exemplary embodiment, both the angles of rotation caused by the buttons 915 and 916 are described to be in steps of 0.5°. However, the steps are not limited to 0.5°. A button 917 is a button for issuing an instruction to vertically extend the frame 906. If the user presses the button 917, the position of the upper side of the frame 906 moves up by a predetermined number of pixels and the position of the lower side moves down by a predetermined number of pixels. A button 918 is a button for giving an instruction to vertically reduce the frame 906. If the user presses the button 918, the position of the upper side of the frame 906 moves down by a predetermined number of pixels and the position of the lower side moves up by a predetermined number of pixels. A button 919 is a button for issuing an instruction to horizontally extend the frame 906. A button 920 is a button for issuing an instruction to horizontally reduce the frame 906. If the user presses a button 904, the position of the frame 906 changed in FIG. 9 is cancelled, and the screen returns to that of FIG. 7.

Figure 10:
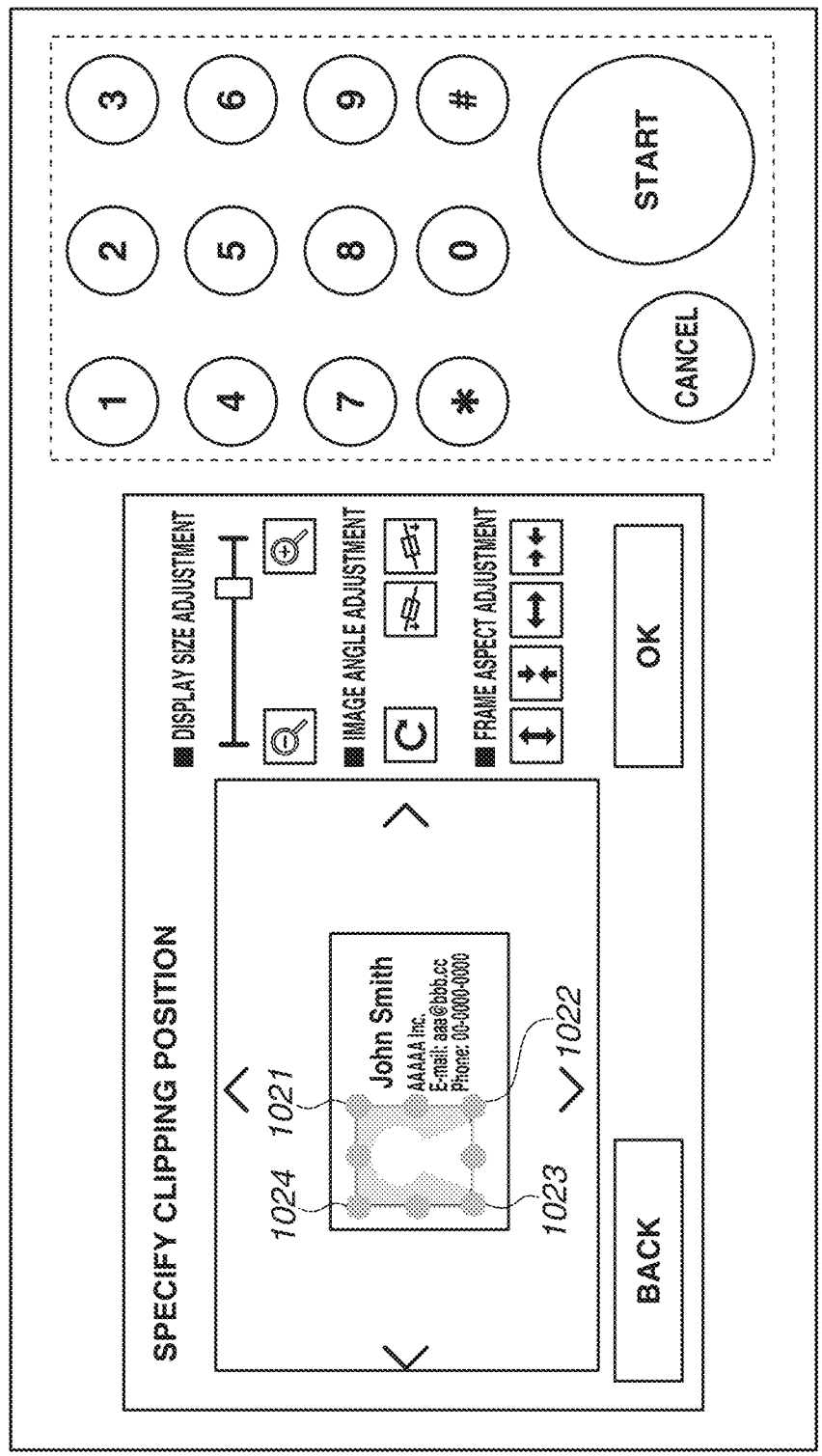
FIG. 10 is a diagram illustrating an example of a case where a position of a frame indicating a repeat target area is modified on the repeat target area specification screen.
Figure 11:
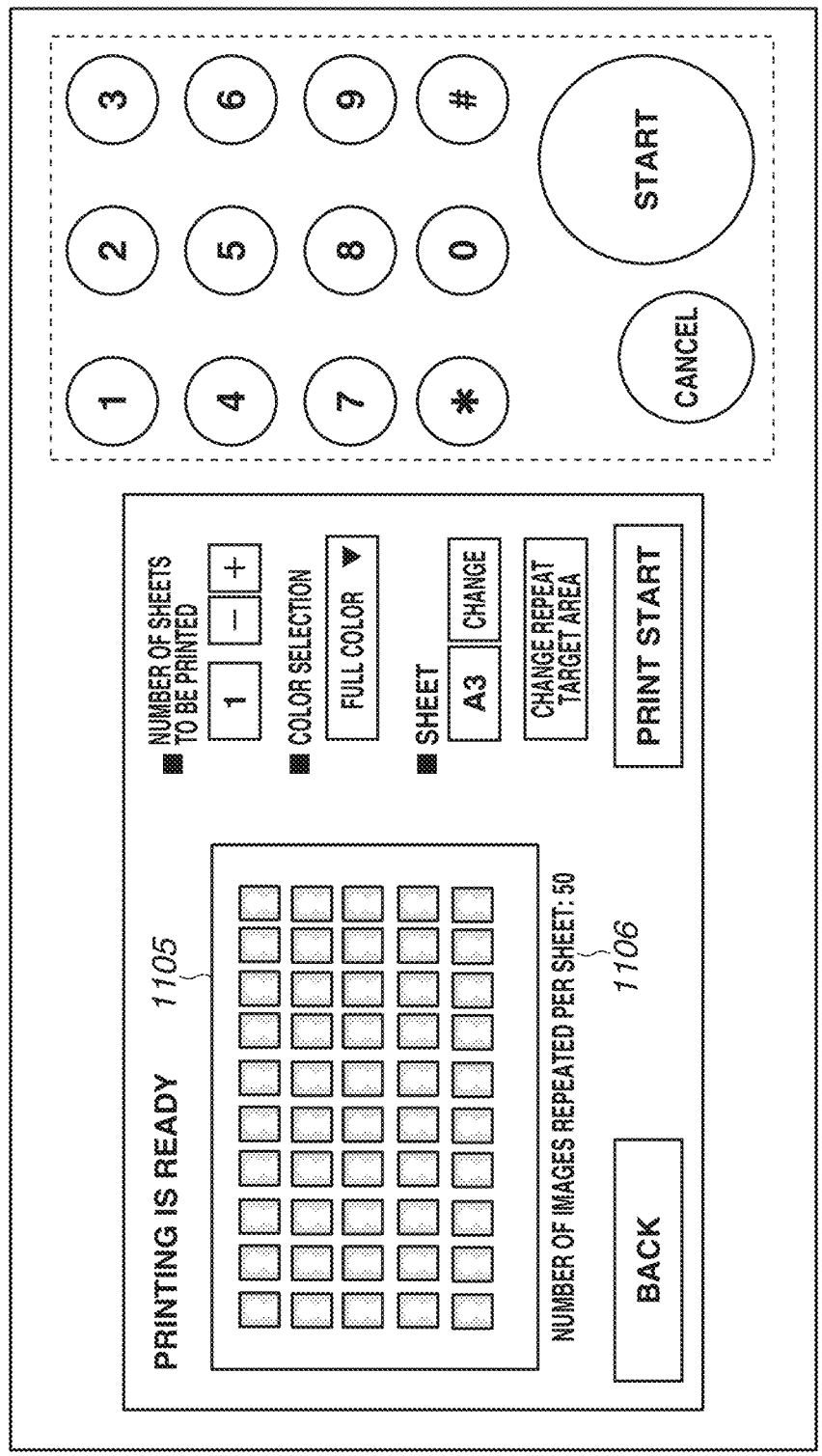
FIG. 11 is a diagram illustrating an example of a preview screen that provides a preview of an image obtained by executing the image repeat processing (repeat layout processing) after the position of the frame indicating the repeat target area is modified.

If the user presses a button 903, the CPU 111 determines the repeat target area based on the position of the frame 906 set at that point in time, and executes the repeat layout processing of step S306 based on the image of the repeat target area. For example, in a case where the user wants to use only a photo area included in the business card image (document image) as the repeat target area, the user adjusts the positions of the vertex handlers 921 to 924 of the frame 906 in FIG. 9 into those of vertex handlers 1021 to 1024 of the frame in FIG. 10. If the user presses the OK button in such a state, the area surrounded by the frame of FIG. 10 is determined as the repeat target area. In step S306, the repeat layout processing is then executed again by using the image of the determined repeat target area. In step S307, a preview image of the output image obtained by the repeat layout processing of step S306 is displayed on a preview screen 1105 as illustrated in FIG. 11. In FIG. 11, image number information 1106 is displayed to indicate how many images of the repeat target area changed in FIG. 10 are laid out.

According to the present exemplary embodiment, the repeat layout processing is described to be performed in such a manner that the images of the repeat target area are printed at a magnification of 100%. However, the magnification is not limited to 100%. For example, if the magnification of the image of the repeat target area can be specified in the screen of FIG. 9, the image repeat processing can be performed with the image of the repeat target area enlarged or reduced. The repeat layout processing of step S306 can then be executed in consideration of the specified magnification.

If, in step S308, the CPU 111 determines that the user's instruction is issued by pressing the sheet size change button 712 (SHEET SIZE CHANGE BUTTON in step S308), the processing proceeds to step S311. In step S311, the CPU 111 presents a plurality of candidate sheet sizes (for example, a plurality of sizes including regular sizes A4, A3, B4, and B5), and determines a user-specified size from among the plurality of candidate sheet sizes. The method for changing the sheet size is not limited to selecting a sheet size from regular sizes. The user can be allowed to manually input an irregular sheet size (vertical and horizontal sizes of a sheet). If the sheet size is changed in step S311, then in step S305, the CPU 111 obtains the changed sheet size. In step S306, the CPU 111 executes the repeat layout processing based on the changed sheet size. In step S307, the CPU 111 displays a preview screen.

If, in step S308, the CPU 111 determines that the user's instruction is issued by pressing the print start button 703 (PRINT START BUTTON in step S308), the processing proceeds to step S312. In step S312, the CPU 111 performs control in such a manner that the printer unit 123 performs printing using the output image generated in step S306.

According to the first exemplary embodiment, the repeat target area specification screen of FIG. 9 displays the tilt-corrected partial document image obtained in step S302, not the scan image of the entire platen obtained in step S301. If the scan image of the entire platen is simply used for a preview display, the business card image included in the scan image is displayed relatively small and the user has difficulty in specifying the area to be repeated. According to the present exemplary embodiment, the partial document image obtained in step S302 is displayed in a larger size, which facilitates the user specifying the area to be repeated. The display of the tilt-corrected partial document image also facilitates the user accurately specifying the repeat target area. Even if a document is obliquely placed and scanned on the platen, the tilt is corrected in step S302. Thus, the user does not need to take care not to tilt the document when placing the document on the platen.

The preview screen of FIG. 7 displayed in step S307 initially displays the preview screen of the output image that is generated by setting the tilt-corrected partial document image obtained in step S302 as an initial repeat target image and executing the repeat layout processing of step S306. The user therefore only needs to press the print start button 703 if the settings are acceptable. The repeat layout processing can thus be executed easily.

According to the first exemplary embodiment, the processing of steps S301 to S307 in FIG. 3 is described to be executed to display the preview screen of FIG. 7 when the user presses the scan start button 603 on the operation screen of FIG. 6. A second exemplary embodiment describes a case where, when the user presses the scan start button 603 on the operation screen of FIG. 6, the repeat target area specification screen of FIG. 9 is displayed to allow the user to check and/or modify the repeat target area before the preview screen of FIG. 7 is displayed.

Figure 8:
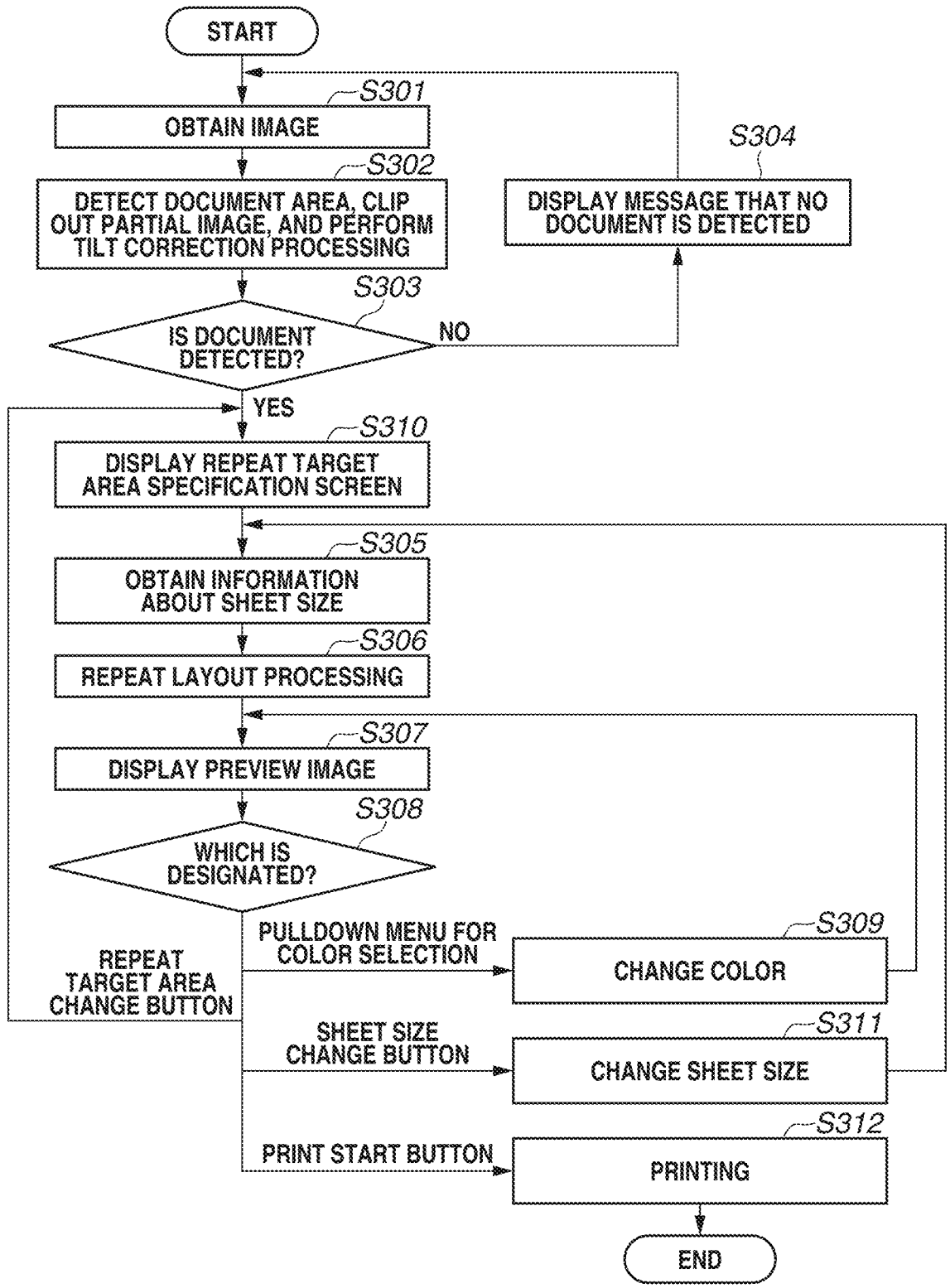
FIG. 8 is a flowchart related to image repeat processing according to a second exemplary embodiment.

FIG. 8 is a flowchart illustrating details of image repeat processing according to the second exemplary embodiment. Differences between the flowchart of the second exemplary embodiment illustrated in FIG. 8 and the flowchart of the first exemplary embodiment illustrated in FIG. 3 will be described. According to the second exemplary embodiment, if, in step S303 of FIG. 8, the CPU 111 determines that there is a document detected (YES in step S303), the processing proceeds to step S310. In step S310, the CPU 111 displays the repeat target area specification screen of FIG. 9. After the repeat target area is determined on the repeat target area specification screen of FIG. 9, the CPU 111 performs the processing of steps S305 to S307 to display the preview screen.

Details of the processing of each step are similar to those in the first exemplary embodiment. A description thereof will thus be omitted.

As described above, according to the second exemplary embodiment, the repeat target area specification screen of FIG. 9 is displayed before the preview screen of FIG. 7 is displayed. The user can thus check the repeat target area in advance, and can easily modify the repeat target area if needed. Similar to the first exemplary embodiment, the repeat target area specification screen of FIG. 9 displays not the scan image of the entire platen obtained in step S301 but the tilt-corrected partial document image obtained in step S302. This facilitates the user accurately specifying the repeat target area.

According to the first exemplary embedment, the preview screen of FIG. 7 is displayed first in the touch panel display area after the user presses the scan start button 603 on the operation screen of FIG. 6. According to the second exemplary embodiment, the repeat target area specification screen of FIG. 9 is displayed first. According to a third exemplary embodiment, whether to display the preview screen of FIG. 7 first or the repeat target area specification screen of FIG. 9 first is adaptively changed based on the scanned document.

Figure 12:
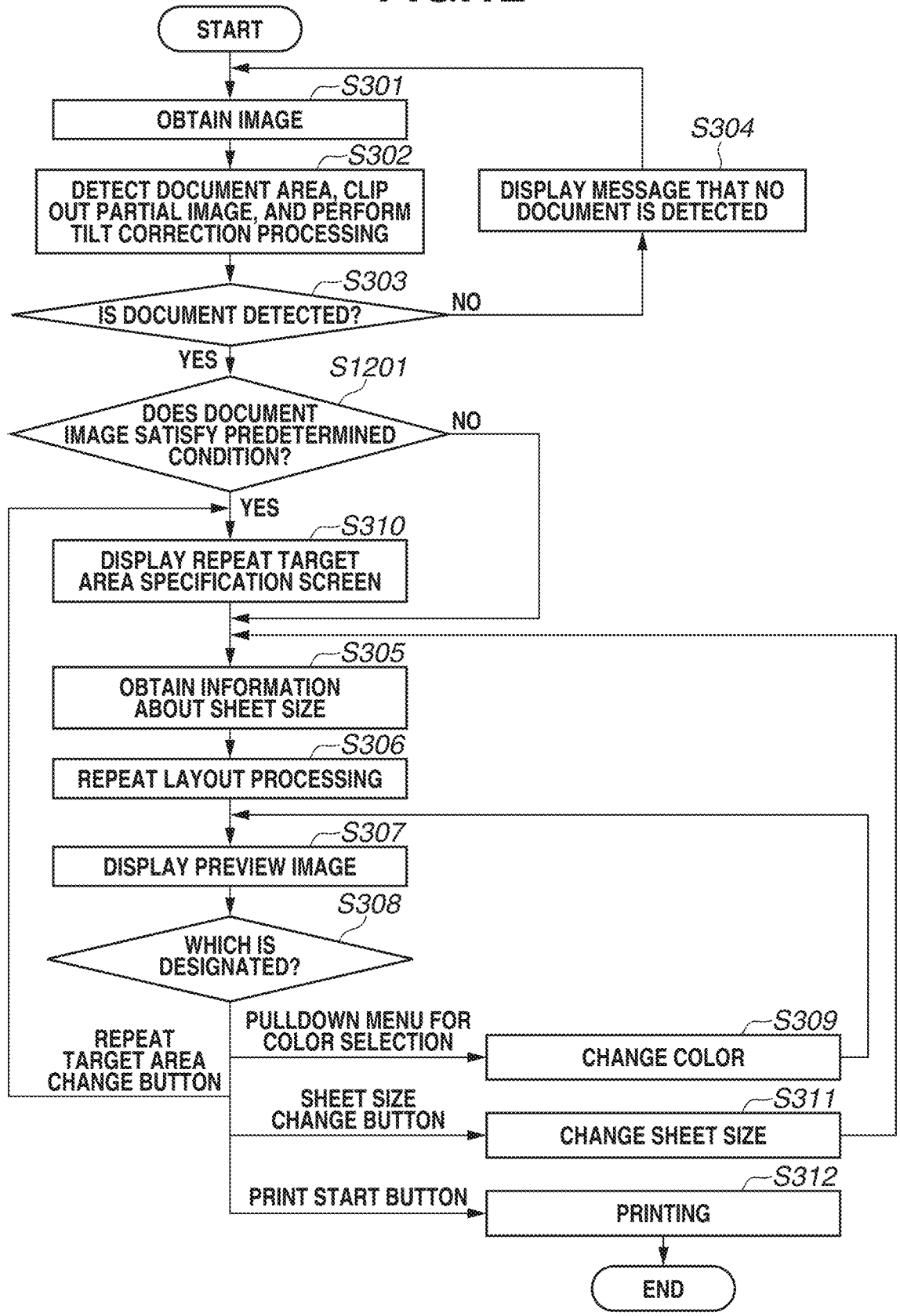
FIG. 12 is a flowchart related to image repeat processing according to a third exemplary embodiment.

Details of image repeat processing according to the third exemplary embodiment will be described with reference to the flowchart of FIG. 12. In FIG. 12, if, in step S303, the CPU 111 determines that there is a document detected (YES in step S303), the processing proceeds to step S1201. In step S1201, the CPU 111 determines whether the document image detected in step S302 satisfies a predetermined condition. In step S1201, if the CPU 111 determines that the document image satisfies the predetermined condition (YES in step S1201), the processing proceeds to step S310. In step S310, the CPU 111 displays the repeat target area specification screen of FIG. 9. Meanwhile, if the CPU 111 determines that the document image does not satisfy the predetermined condition (NO in step S1201), the processing proceeds to step S305. The CPU 111 performs the processing of steps S305 to S307 to display the preview screen of FIG. 7.

An example of the predetermined condition to be used for the determination in step S1201 is whether the size of the document image detected in step S302 is greater than a predetermined size (for example, A4 size). If the size of the document image is greater, part of the document is likely to be clipped out and used as a repeat target. The processing then proceeds to step S310, and the CPU 111 displays the repeat target area specification screen of FIG. 9.

Another example of the predetermined condition used for the determination in step S1201 will be described. For example, area division processing for dividing an image into areas of different attributes, such as text, a photo, and a table, is performed on the document image detected in step S302. Then, the CPU 111 determines that a predetermined condition is satisfied if the document image includes areas of a plurality of attributes. If the document image includes areas of a plurality of attributes (for example, a text area and a photo area), any one of the areas is likely to be used as a repeat target. The processing therefore proceeds to step S310, and the CPU 111 displays the repeat target area specification screen of FIG. 9.

Details of the processing of the steps S301 to S312 in FIG. 12 are similar to those of the processing of the corresponding step numbers in the first and second exemplary embodiments. A description thereof will thus be omitted.

According to the second exemplary embodiment, the document area detected in step S302 is displayed as an initial area of the repeat target area on the repeat target area specification screen of FIG. 9. According to a fourth exemplary embodiment, face area detection (processing for detecting a photo area including a human face) is further performed on the document image detected in step S302, and the detected photo area is displayed as an initial area of the repeat target area.

Figure 13:
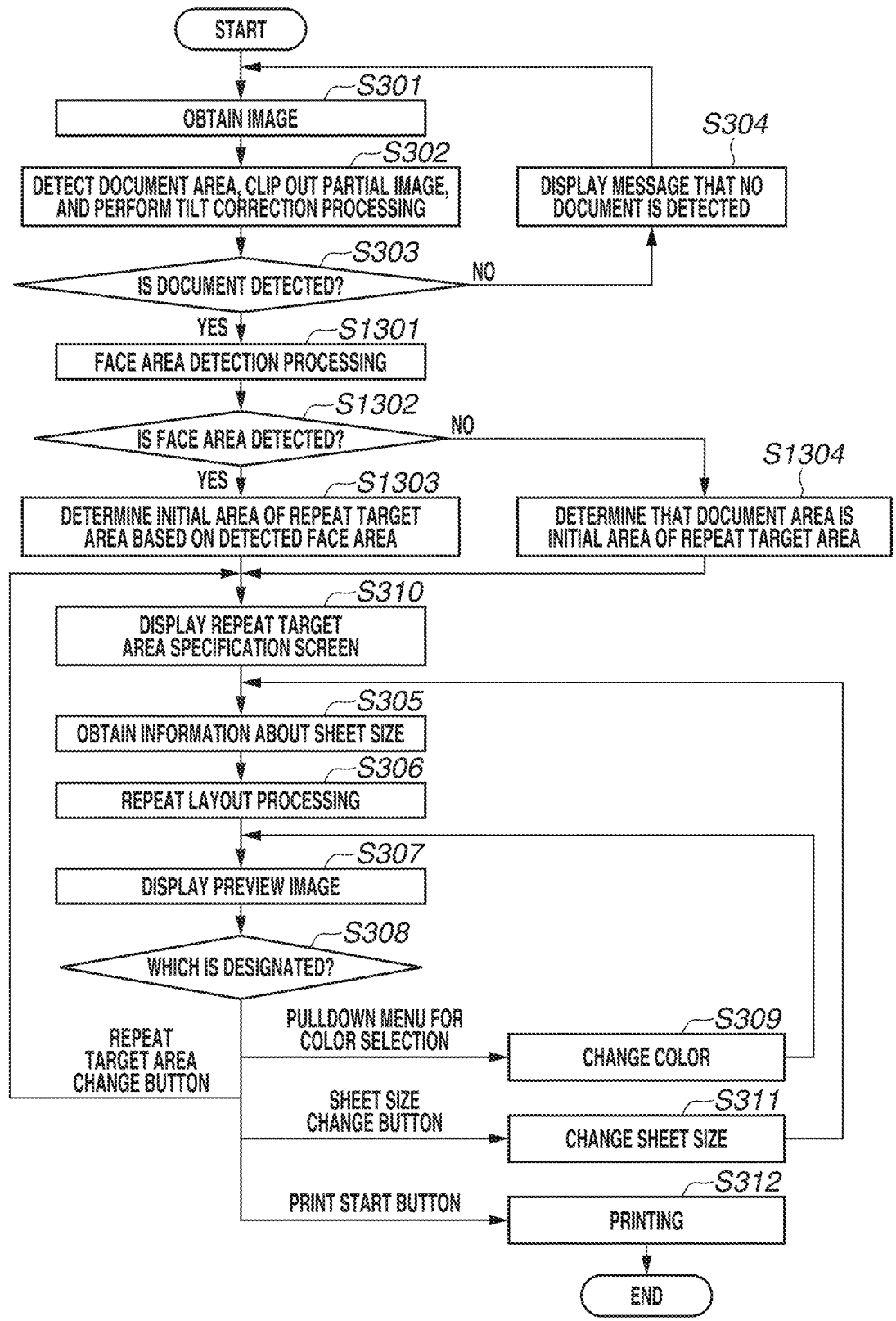
FIG. 13 is a flowchart related to image repeat processing according to a fourth exemplary embodiment.

FIG. 13 is a flowchart illustrating details of image repeat processing according to the fourth exemplary embodiment. Differences between the flowchart of the fourth exemplary embodiment illustrated in FIG. 13 and the flowchart of the second exemplary embodiment illustrated in FIG. 8 will be described. According to the fourth exemplary embodiment, if, in step S303, the CPU 111 determines that there is a document detected (YES in step S303), the processing proceeds to step S1301.

In step S1301, the CPU 111 performs processing (face area detection processing) for detecting a photo area including a human face (i.e., face area) on the image in the document area detected in step S302. The face area detection processing detects an area including a human face, for example, by detecting local feature amounts from the image and performing pattern matching between the detected local feature amounts and previously-stored feature amounts of various facial parts (eyes, nose, and mouth). The technique of the face area detection processing is not limited to the foregoing, and different face area detection processing may be used.

In step S1302, the CPU 111 determines whether a face area is detected by the face area detection processing. If the CPU 111 determines that a face area is detected (i.e., there is a photo area including a human face) (YES in step S1302), the processing proceeds to step S1303. If the CPU 111 determines that no face area is detected (i.e., there is no photo area including a human face) (NO in step S1302), the processing proceeds to step S1304.

In step S1303, the CPU 111 determines an area to be the initial area of the repeat target area based on the face area detected in step S1301. According to the present exemplary embodiment, the entire detected photo area including a face is used as the initial area of the repeat target area. However, this is not restrictive. The boundary of a photo area may be determined by using a Hough transformation-based line detection technique. A technique for detecting a photo area by performing labeling processing on non-white pixels may be used. With reference to the positions of facial parts such as eyes, nose, and mouth, an area a predetermined size greater from the reference positions may be used as the initial area. Aside from human face detection, features such as human shoulders and breast may be detected, and an area above the human breast (i.e., bust area) may be used as the initial area. After a photo area including a human face is determined to be the initial area of the repeat target area in step S1303, the processing proceeds to step S310. If the business card 400 including the facial photo area 401 illustrated in FIG. 4 is scanned, the facial photo area 401 is determined to be the initial area in step S1303. In step S310, the area (facial photo area) in the frame surrounded by the vertex handlers 1021 to 1024 as illustrated in FIG. 10 is therefore displayed as the initial area of the repeat target area.

Figure 14:
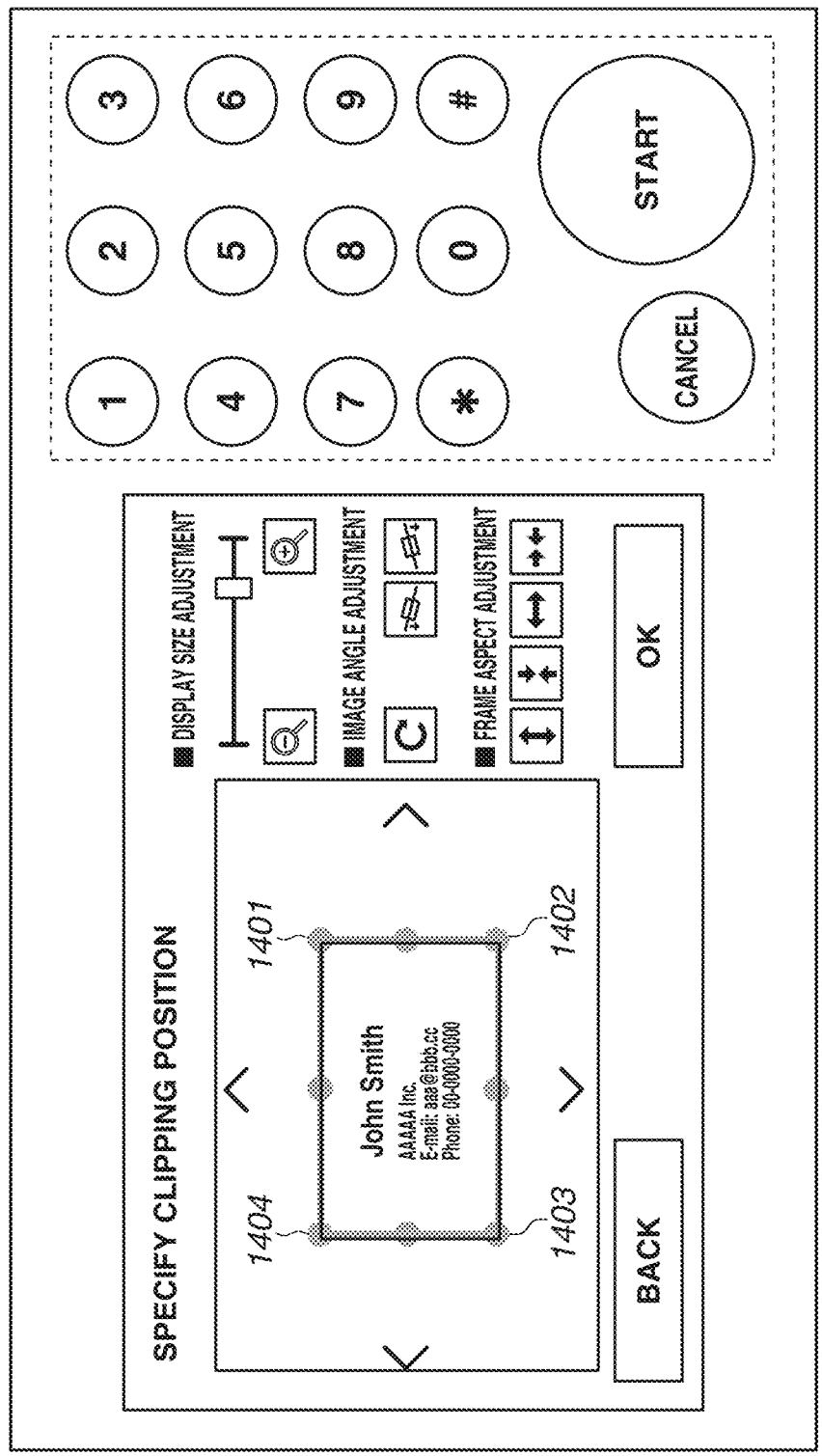
FIG. 14 is a diagram illustrating an example of an initial display of the repeat target area specification screen according to the fourth exemplary embodiment when a face area is not detected.

In step S1304, the CPU 111 determines that the document area detected in step S302 is the initial area of the repeat target area. After the initial area of the repeat target area is determined in step S1304, the processing proceeds to step S310. As illustrated in FIG. 14, if a business card including no facial photo is scanned, no face area is detected in step S1301. The document area detected in step S302 is thus determined to be the repeat target area. In step S310, an area (document area) in the frame surrounded by vertex handlers 1401 to 1404 as illustrated in FIG. 14 is then displayed as the initial area of the repeat target area.

As described above, according to the fourth exemplary embodiment, the area to be initially displayed on the repeat target area specification screen is switched based on whether a face area is detected. Details of the processing of steps S301 to S312 in FIG. 13 are similar to those of the processing of the corresponding step numbers in the first and second exemplary embodiments. A description thereof will thus be omitted.

According to the fourth exemplary embodiment, a photo area including a human face is displayed as the initial area of the repeat target area on the repeat target area specification screen if the face area is detected from the document image. According to a fifth exemplary embodiment, the repeat target area specification screen is displayed if a face area is detected.

According to the fifth exemplary embodiment, like the flowchart of the fourth exemplary embodiment illustrated in FIG. 13, the CPU 111, in step S1302, detects a photo area including a human face. In step S1303, the CPU 111 determines the detected face area as the initial area of the repeat target area. In step S310, the CPU 111 then displays a repeat target area specification screen (FIG. 15) according to the fifth exemplary embodiment, which is different from the repeat target area specification screen (FIG. 10) according to the fourth exemplary embodiment.

Figure 15:
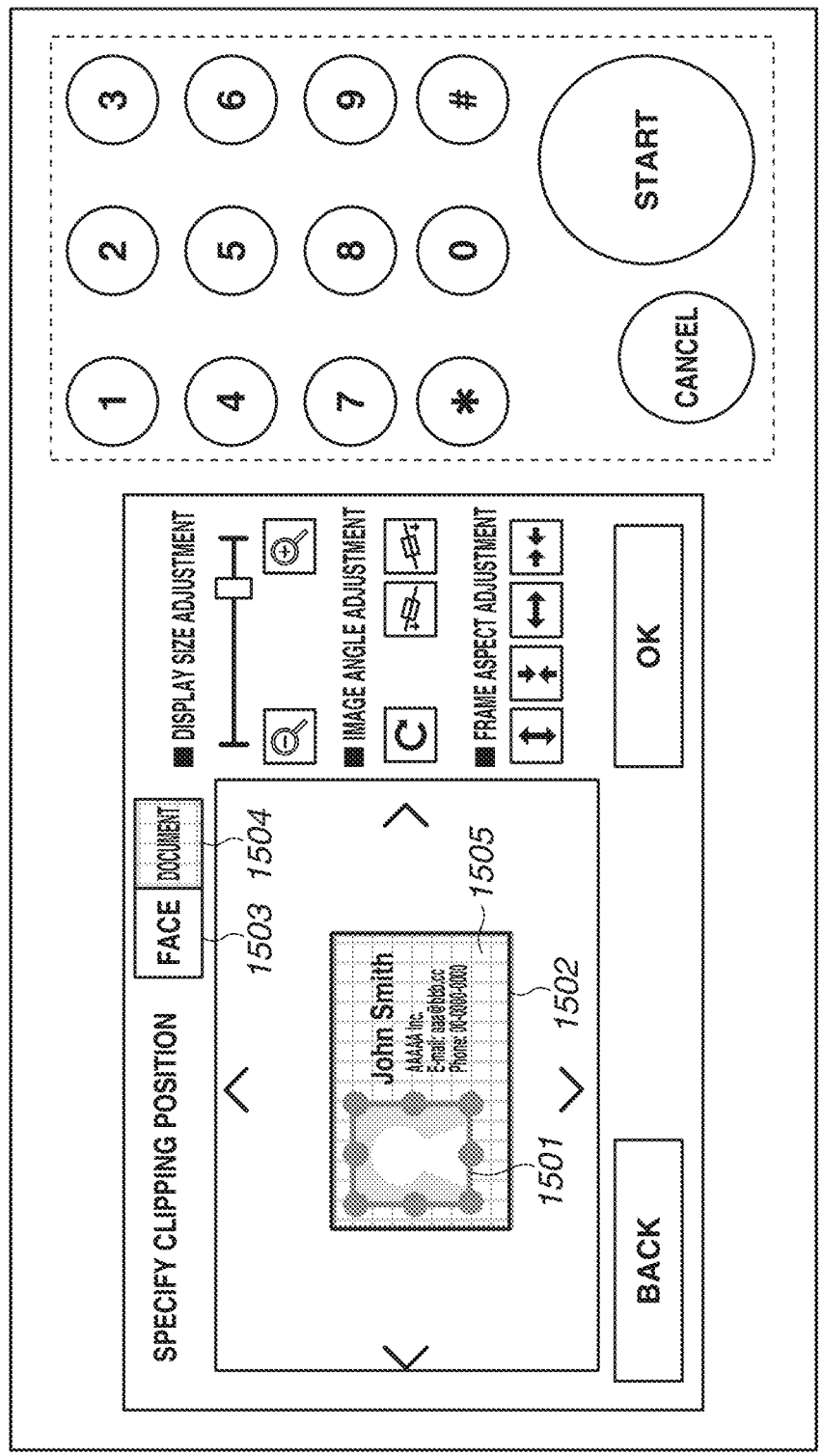
FIG. 15 is a diagram illustrating an example of an initial display of the repeat target area specification screen according to a fifth exemplary embodiment when a face area is detected.

FIG. 15 illustrates an example of the repeat target area specification screen according to the fifth exemplary embodiment displayed when a face area is detected. The repeat target area specification screen of FIG. 15 includes additional buttons 1503 and 1504 for switching candidates for the repeat target area. Since the CPU 111 determines that a photo area including a face is the initial area of the repeat target area in step S1303, an area 1501 is displayed as an initial repeat target area with vertex handlers. The button 1503 indicating that the repeat target area is a face area is in a selected state. The button 1504 is in a deselected state here. A partial area 1505 inside a document area 1502 may be shaded (or grayed out) to identifiably indicate that the partial area 1505 is not the repeat target area.

Figure 16:
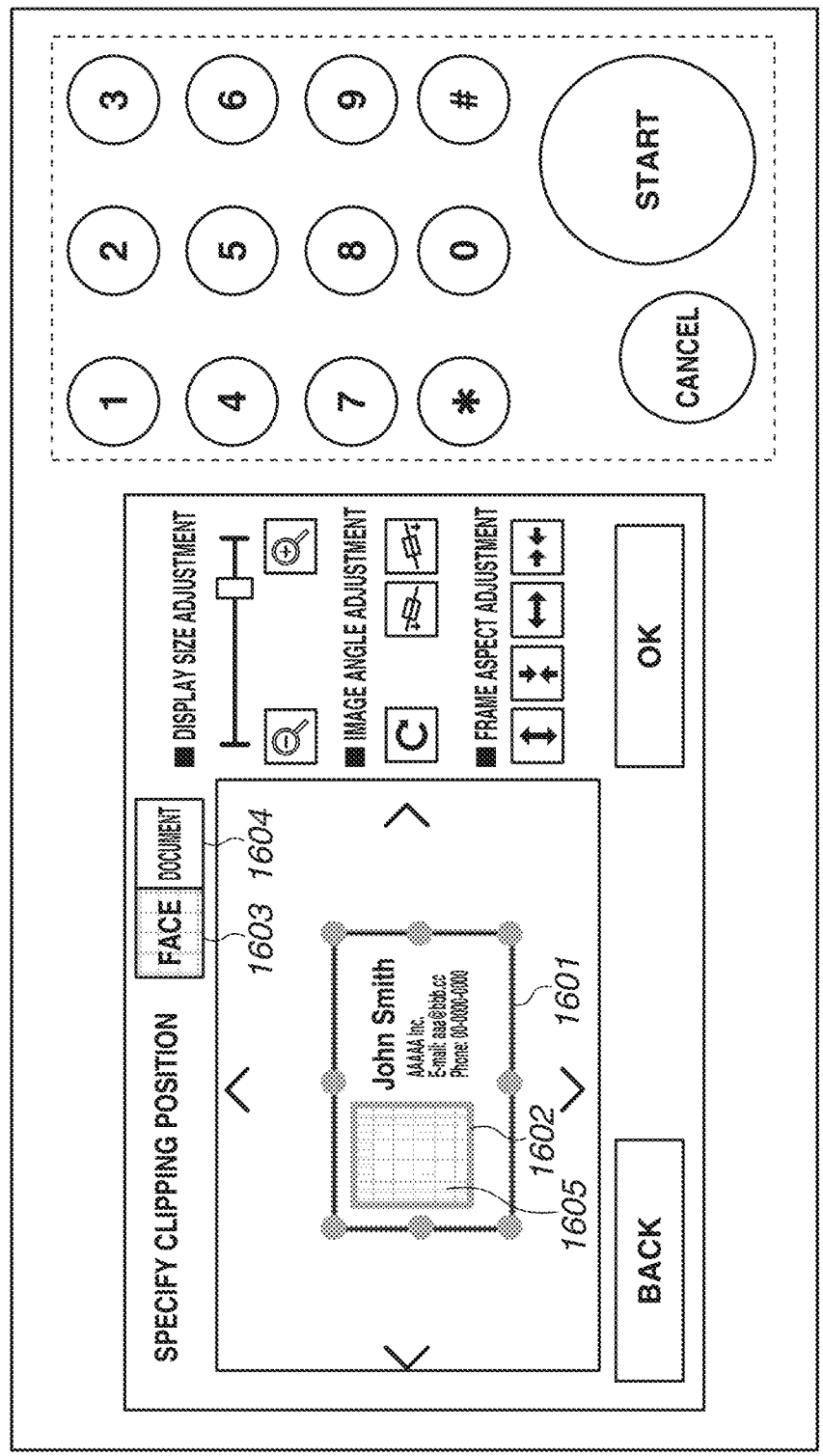
FIG. 16 is a diagram illustrating an example of the repeat target area specification screen according to the fifth exemplary embodiment when a button for specifying a document area is selected.

If the user selects the button 1504 (or area 1505) for selecting the document area on the repeat target area specification screen of FIG. 15, the CPU 111 performs control to switch display in such a manner that the document area detected in step S302 is displayed as the repeat target area. FIG. 16 illustrates an example of the repeat target area specification screen when the button 1504 is selected.

In FIG. 16, a button 1604 for designating the document area is in a selected state, and a button 1603 for designating the face area is in a deselected state. A document area 1601 is displayed as the repeat target area with vertex handlers. If the user selects the button 1603 (or an area 1605 inside a face area 1602) for selecting the face area on the repeat target area specification screen of FIG. 16, the screen returns to that of FIG. 15, and the repeat target area is switched to the face area.

As described above, in the fifth exemplary embodiment, if a face area is detected, the face area and the document area can be easily selected and switched on the repeat target area specification screen.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiments of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computerized configuration(s) of the system or apparatus by, for example, reading out and executing the computer executable instructions from the storage medium to perform the functions of one or more of the above-described embodiments and/or controlling the one or more circuits to perform the functions of one or more of the above-described embodiments. The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2018-045958, filed Mar. 13, 2018, and No. 2019-001956, filed Jan. 9, 2019, which are each hereby incorporated by reference herein in their entirety.

What is claimed is:

1. An image processing apparatus comprising:
a memory that stores a program; and
a processor that executes the program to perform:
obtaining a tilt-corrected document image by performing image analysis processing on a scan image to detect a document area and performing extraction and tilt correction of a document image based on the detected document area;
displaying a repeat target area specification screen for displaying the obtained tilt-corrected document image and a frame indicating a repeat target area, wherein the frame is initially displayed as a frame indicating an area corresponding to the obtained tilt-corrected document image, and wherein a position of the frame indicating the repeat target area can be changed based on a user's instruction on the repeat target area specification screen;

generating a repeat layout-processed output image by repeatedly laying out an image of the repeat target area within a specified sheet size, the repeat target area being determined based on the frame set on the repeat target area specification screen; and executing print processing using the repeat layout-processed output image.

2. The image processing apparatus according to claim 1, wherein the processor executes the program to further perform:

displaying a preview screen including a preview image of the repeat layout-processed output image; and displaying, in a case where a user gives an instruction to change the repeat target area on the preview screen, the repeat target area specification screen.

3. The image processing apparatus according to claim 2, wherein the processor generates the repeat layout-processed output image by repeatedly laying out the obtained tilt-corrected document image within the specified sheet size, the obtained tilt-corrected document image being used as an image of an initial repeat target area, and wherein the processor initially displays a preview image including a preview image of the repeat layout-processed output image generated based on the image of the initial repeat target area.

4. The image processing apparatus according to claim 1, wherein the processor executes the program to further perform displaying a preview screen including a preview image of the repeat layout-processed output image, wherein the repeat target area specification screen is displayed before the preview screen, and wherein the processor displays the preview screen including the preview image of the repeat layout-processed output image generated by using the image of the repeat target area identified based on the frame determined on the repeat target area specification screen.

5. The image processing apparatus according to claim 1, wherein the processor executes the program to further perform:

displaying a preview screen including a preview image of the repeat layout-processed output image;

determining whether the tilt-corrected document image obtained satisfies a predetermined condition;

displaying, in a case where it is determined that the tilt-corrected document image satisfies the predetermined condition, the repeat target area specification screen; and displaying, in a case where it is determined that the tilt-corrected document image does not satisfy the predetermined condition, the preview screen including the preview image of the repeat layout-processed output image generated based on the image of an initial repeat target area, using the tilt-corrected document image as the image of the initial repeat target area.

6. The image processing apparatus according to claim 5, wherein it is determined that the predetermined condition is satisfied in a case where the tilt-corrected document image has a size greater than a predetermined size.

7. The image processing apparatus according to claim 5, wherein it is determined that the predetermined condition is satisfied in a case where the tilt-corrected document image includes areas of a plurality of attributes.

8. The image processing apparatus according to claim 1, wherein the processor executes the program to further perform:

detecting a photo area including a human face from the tilt-corrected document image obtained;

displaying, in a case where no photo area including the human face is detected, the tilt-corrected document image and the frame indicating the repeat target area and displaying the repeat target area specification screen for changing the position of the frame indicating the repeat target area based on the user's instruction, using the area corresponding to the tilt-corrected document image as an initial repeat target area; and displaying, in a case where the photo area including the human face is detected, the tilt-corrected document image and the frame indicating the repeat target area and displaying the repeat target area specification screen for changing the position of the frame indicating the repeat target area based on the user's instruction, using the detected photo area as the initial repeat target area.

9. The image processing apparatus according to claim 8, wherein, in a case where the photo area including the human face is detected, the processor further displays a button in the repeat target area specification screen, the button being used for switching the repeat target area to an area corresponding to the tilt-corrected document image.

10. An image processing method comprising:

obtaining a tilt-corrected document image by performing image analysis processing on a scan image to detect a document area and performing extraction and tilt correction of a document image based on the detected document area;

displaying a repeat target area specification screen for displaying the obtained tilt-corrected document image and a frame indicating a repeat target area, wherein the frame is initially displayed as a frame indicating an area corresponding to the obtained tilt-corrected document image, and wherein a position of the frame indicating the repeat target area can be changed based on a user's instruction on the repeat target area specification screen;

generating a repeat layout-processed output image by repeatedly laying out an image of the repeat target area within a specified sheet size, the repeat target area being determined based on the frame set on the repeat target area specification screen; and executing print processing using the repeat layout-processed output image.

11. A non-transitory storage medium storing a program for causing a computer to perform:

obtaining a tilt-corrected document image by performing image analysis processing on a scan image to detect a document area and performing extraction and tilt correction of a document image based on the detected document area;

displaying a repeat target area specification screen for displaying the obtained tilt-corrected document image and a frame indicating a repeat target area, wherein the frame is initially displayed as a frame indicating an area corresponding to the obtained tilt-corrected document image, and wherein a position of the frame indicating the repeat target area can be changed based on a user's instruction on the repeat target area specification screen;

generating a repeat layout-processed output image by repeatedly laying out an image of the repeat target area within a specified sheet size, the repeat target area being determined based on the frame set on the repeat target area specification screen; and executing print processing using the generated repeat layout-processed output image.

12. An image processing apparatus comprising:
a memory that stores a program; and
a processor that executes the program to perform:
obtaining a tilt-corrected image by performing image analysis processing on a scan image to detect a document area and performing tilt correction based on the detected document area;
displaying a screen for displaying the obtained tilt-corrected image and a frame indicating a target area, wherein the frame is initially displayed as a frame indicating an area corresponding to the detected document area, and wherein a position of the frame can be changed based on a first user's instruction on the screen; and
executing a process using an image of the target area corresponding to the frame being displayed on the screen.

13. The image processing apparatus according to claim 12, wherein the process is executed using the image of the target area corresponding to the frame being displayed on the screen when a second user's instruction is performed on the screen.

14. The image processing apparatus according to claim 12, wherein the process is a process for generating a repeat layout-processed image by repeatedly laying out the image of the target area within a specified sheet size.

15. The image processing apparatus according to claim 14, wherein the processor executes the program to further perform print processing using the repeat layout-processed image.

16. The image processing apparatus according to claim 12, wherein the frame is initially displayed, on the obtained tilt-corrected image, at a position of four sides of the area corresponding to the detected document area.

17. An image processing method comprising:
obtaining a tilt-corrected image by performing image analysis processing on a scan image to detect a document area and performing tilt correction based on the detected document area;
displaying a screen for displaying the obtained tilt-corrected image and a frame indicating a target area, wherein the frame is initially displayed as a frame indicating an area corresponding to the detected document area, and wherein a position of the frame can be changed based on a first user's instruction on the screen; and
executing a process using an image of the target area corresponding to the frame being displayed on the screen.

18. A non-transitory storage medium storing a program for causing a computer to perform:
obtaining a tilt-corrected image by performing image analysis processing on a scan image to detect a document area and performing tilt correction based on the detected document area;
displaying a screen for displaying the obtained tilt-corrected image an a frame indicating a target area, wherein the frame is initially displayed as a frame indicating an area corresponding to the detected document area, and wherein a position of the frame can be changed based on a first user's instruction on the screen; and
executing a process using an image of the target area corresponding to the frame being displayed on the screen.

* * * * *